Figure 1:
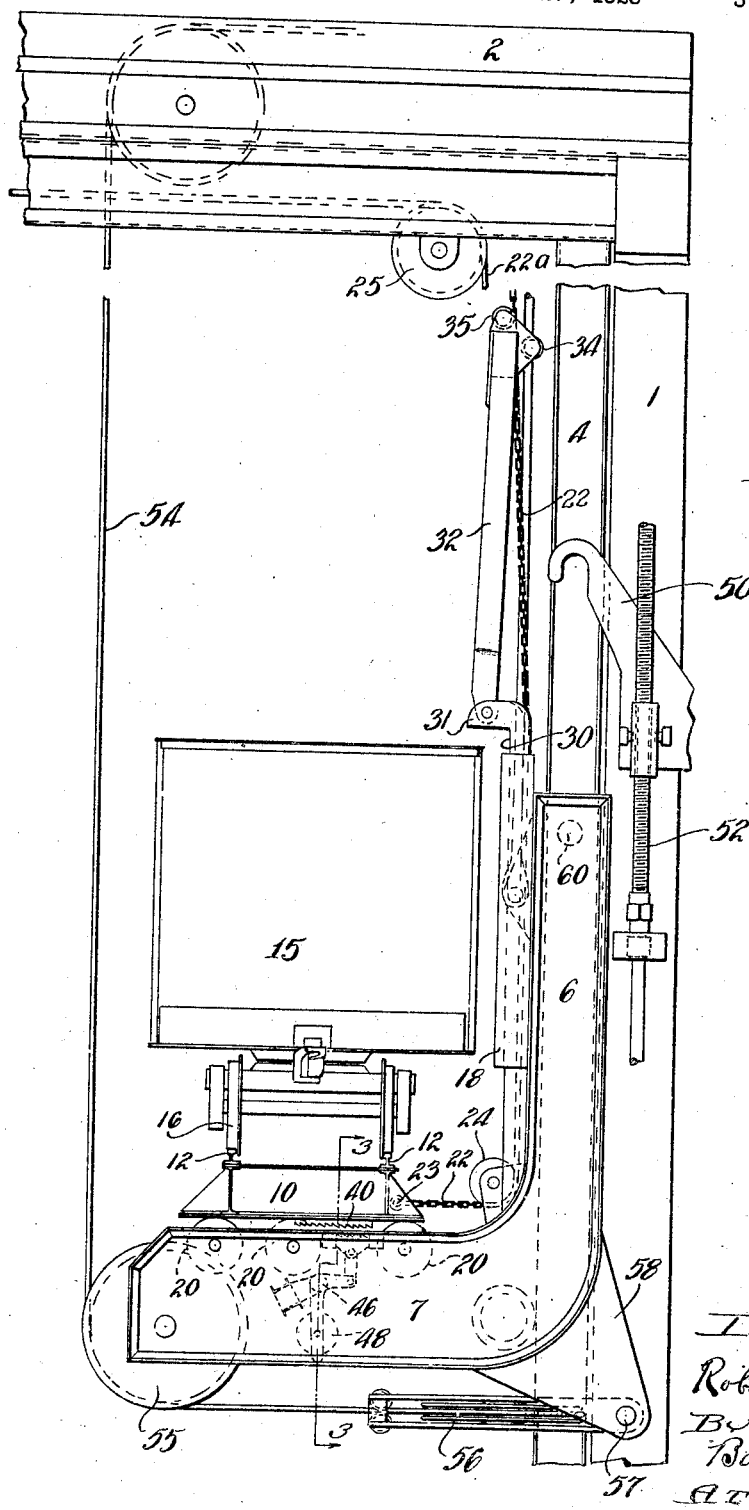

March 2, 1926.  
R. W. CRIST  
LOCKING DEVICE FOR CAR DUMPER PLATFORMS  
Filed Dec. 27, 1923

1,575,415  
3 Sheets-Sheet 2

March 2, 1926.

R. W. CRIST 1,575,415

LOCKING DEVICE FOR CAR DUMPER PLATFORMS

Filed Dec. 27, 1923   3 Sheets-Sheet 3

INVENTOR
Robert W. Crist,
By Baker Macklin
ATTORNEYS

Patented Mar. 2, 1926.

1,575,415

UNITED STATES PATENT OFFICE.

ROBERT W. CRIST, OF BEDFORD, OHIO, ASSIGNOR TO THE McMYLER-INTERSTATE COMPANY, OF CLEVELAND, OHIO, A CORPORATION OF OHIO.

LOCKING DEVICE FOR CAR-DUMPER PLATFORMS.

Application filed December 27, 1923. Serial No. 682,902.

*To all whom it may concern:*

Be it known that I, ROBERT W. CRIST, a citizen of the United States, residing at Bedford, in the county of Cuyahoga and State of Ohio, have invented a certain new and useful Improvement in a Locking Device for Car-Dumper Platforms, of which the following is a full, clear, and exact description, reference being had to the accompanying drawings.

This invention relates to car dumpers of the type having a cradle and a platen or platform in the cradle on which a loaded car is run, and which is adapted to lift and invert the car to dump its contents from the open top. In inverting a car with such a dumper support, means are provided for holding the car against the rails on the platen when in a substantially inverted position. It sometimes happens that while the car is so held in its dumping position the car will move downwardly or sag slightly in its supports, due to the breaking or shifting of material which may have been caught between the supports and the top of the car, with the result that the car wheels and flanges leave the rails of the platen. It is also usual to provide means for shifting the platen on the cradle laterally as the cradle leaves its foundation during the first upward movement of the cradle and car, bringing the car sideways against the side of the cradle. This side movement is commonly accomplished by the clamping counterweights whose cables are attached to the platen, and when the car in its inverted position sags away from the rails, the platen is thereby still further moved sideways, being relieved from the restraining force which was produced by the car while firmly held on to the rails. This sideways movement brings the rails out of line with the wheels of the car, with the result that when the cradle is rotated to upright position the car wheels do not again come on to the rails, and thus the difficulties incident to the derailment of a car are encountered.

An object of the present invention, therefore, is to provide a means to prevent the platen on the cradle of the car dumper from moving sideways, in case the car which is being dumped should leave the platen rails as described.

A more specific object is to provide such a mechanism for restraining the cradle from lateral movement when the car leaves the rails in its inverted position, which shall be simple, very effective in operation, and capable of functioning to accurately engage and restrain the platen in various positions which the platen may assume on the cradle in the bringing of different cars, varying in width, against the side of the cradle.

Other objects include so constructing such a latching and restraining mechanism that it may be very certain in operation and may be capable of application to various existing forms of car dumper cradles.

Other objects will become apparent in the following description which refers to the drawings illustrating a preferred embodiment of my invention. The essential characteristics are summarized in the claims.

Figure 2:
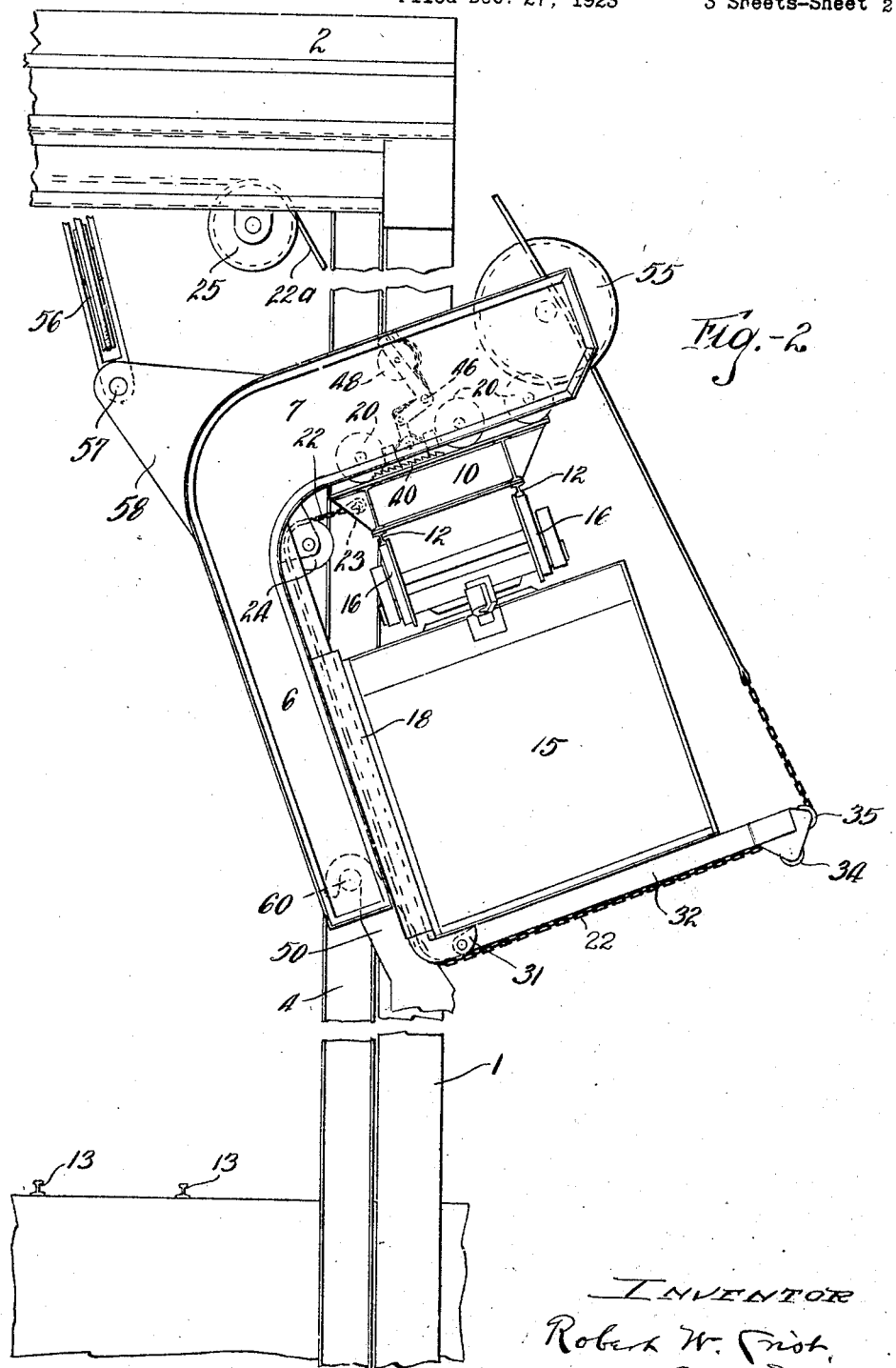
Figure 3:
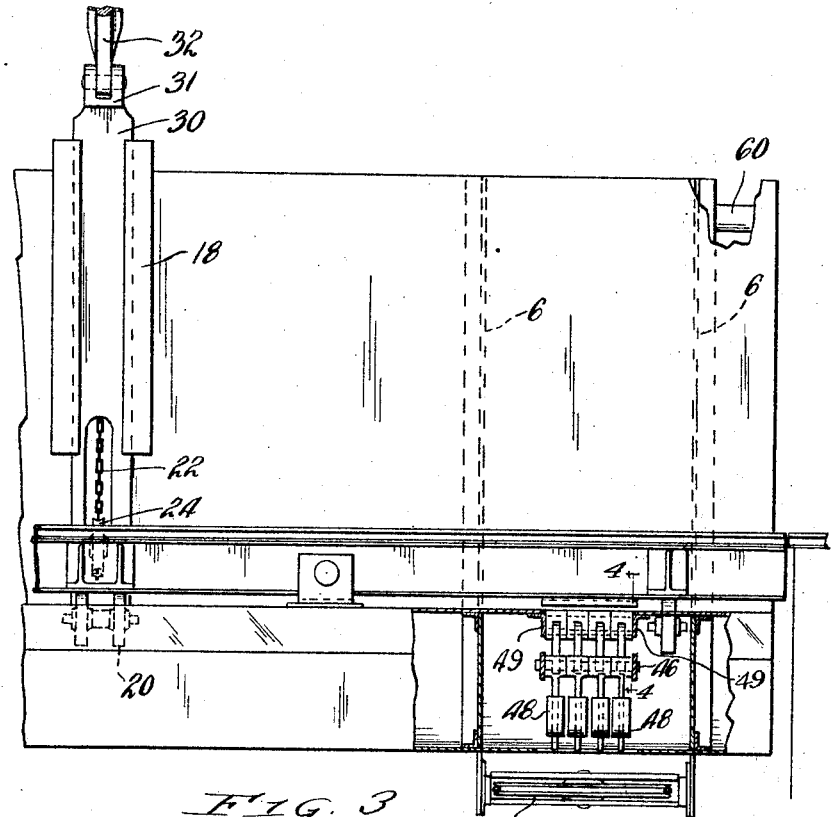
Figure 4:
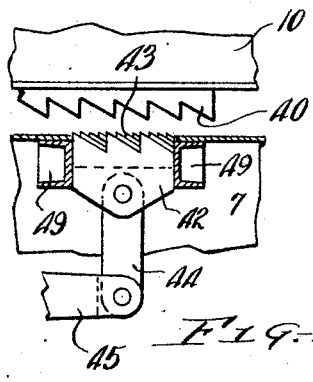
Figure 5:
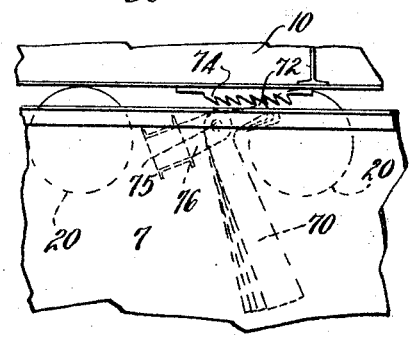

In the drawings, Fig. 1 is an end elevation of the cradle and portion of the car dumper tower frame showing a car on the cradle; Fig. 2 is a view of the same parts showing the cradle turned over with the car in a dumping position; Fig. 3 is a sectional elevator of a portion of the cradle showing one of the latching mechanisms; Fig. 4 is a sectional detail taken transversely through a portion of the cradle and platen showing the latching mechanisms; Fig. 5 is a similar view illustrating a modified form of latching device.

A portion of the car dumper tower frame is indicated in the drawings as consisting of uprights and cross members 2 at the top of the frame which may be of any suitable construction. Guide channels 4 fixed in the frame at each end of the cradle form a vertical trackway therefor. The cradle is shown as consisting of an upright side portion 6 and transverse horizontal supporting members 7 suitably connected to form a rigid frame carrying a laterally movable platen 10 on which are mounted rails 12, adapted when the cradle is in its lowermost position to stand in alignment with a trackway leading on to the cradle and away from it, so that cars may be successively moved on to and away from it in the usual manner.

In Fig. 2, the rails of the track leading away from the cradle are indicated at 13. 15 indicates a car with its wheels 16 on the platen rails 12. On the side of the cradle 6 may be provided vertical wooden bumpers 18 against which the side of the car may rest when being turned over to dumping position, side movement being allowed by the platen 10 moving with the car toward the side of the cradle 6. To this end the usual supporting wheels 20 are provided on the cradle engaging cross members upon the base of the platen, as shown in Figs, 1, 2, and 3.

A flexible member, shown as a chain 22 attached at 23 to the platen, is led about a sheave 24 and thence upwardly and is continued preferably in the nature of the cable 22ª, shown as extending over a sheave 25 on one of the cross frame members above the cradle. Clamps, shown as each consisting of a vertical slidable member 30, with an inwardly extending head are mounted in suitable guideways 18 on the side of the cradle. The clamps each have a guiding groove for the chain 22 and are adapted to engage the tops of the car side while the member 18 receives the side thereof. A clamp, link 32 pivoted to the inwardly extending head 31 of the member 30 carries at its free end guiding sheaves 34 and 35 embracing the chain, so that it may be brought across the top of the car when latter is turned over. The pull on this flexible member 22 draws the car against the side of the cradle, that is, against the bumpers, and the flanges in the car wheels and the weight of the car on the platen stops the lateral movement of the platen when the car rests against the bumpers. As stated, it is the purpose of the present invention to latch the platen in this position, which varies with cars of different widths, so that when the weight of the car is removed from the platen, particularly when the car sags downwardly, the platen is held in position to again receive the wheels of the car.

It is also necessary that such latching means be very heavy and strong while still allowing operative locking engagement in a series of closely related positions. A very satisfactory form or arrangement is illustrated particularly in Figs. 1 to 4. As there shown, on the underside of the platen is firmly mounted a rack having ratchet teeth as indicated at 40 long enough to extend over a series of correspondingly toothed latch members 42, shown as each having three teeth 43. I have shown four of these latch members, and the teeth of each are offset from the corresponding teeth of the neighboring slide by a distance equal to one fourth of that between adjacent teeth on any slide. Thus I have what may be called a verniered arrangement of teeth.

Each member 42 is connected by a link 44 with a bell crank 45, pivotally supported on the transverse shaft 46 carried in suitable brackets rigid with the frame of the cradle, and having counterweight members 48, whereby each latch member is moved upwardly as the cradle is turned to dumping position. The slides 42 are shown as rigidly supported at each side by members 49 serving to form a boxlike guideway rigid with the cradle. As each may be moved upwardly independently of the other until stopped by the teeth 40 of the ratchet on the cradle, at least one of the sets of teeth 43 will come into firm engagement with the full vertical faces of the ratchet 40 and 43. The teeth 43 being progressively staggered with relation to those of the next slide latch 42, and the teeth 40 extending over all four members as shown provide for an engagement in several positions within the distance from one tooth to another. Therefore, the ratchet teeth may be of such size as to be thoroughly effective and yet the movement of the platen will be arrested by some one of the latch members before the rails can move away from proper alignment with the car wheels.

The usual cross beam or girder supporting the dumping chute or apron is not shown in the drawings except that at each end thereof is a large bracket carrying a pivot ear shown at 50. The apron is made vertically adjustable by any suitable well known means, such as a large supporting screw, indicated at 52, at each end of the girder. Lifting cables are indicated at 54, extending over sheaves 55 and through a pulley block 56 pivoted at 57 to brackets 58 rigid with the cradle, and serve for tilting the cradle in the usual manner. The cradle with the car thereon is elevated until a pin 60 at each end meets the socket of the corresponding pivot ear 50, whereupon the car and cradle are swung about this pivot as a center to tilt it to a dumping position, shown in Fig. 2.

During the first part of the elevating movement, the car is brought against the side of the cradle, as described, and the tilting of the cradle causes the weights 48 to urge the ratchet slides 42 upwardly into engagement with the teeth 40, at least one of which effects an engagement for substantially the full depth of the teeth. Any further side movement of the cradle is prevented, even though the car which is held in position by the clamps and loops, as described, may sag away from the rails when in the inverted position. On the return of the car to its upright position, the wheels meet the rails which have thus been held in the same position with relation to the car, and, as the cradle assumes its upright position, the weights 48 withdraw the latches and the platen may be brought into alignment with the stationary rails at the opposite ends of the apparatus in the usual manner.

The modified form of latch illustrated in

Fig. 5 consists of a series of simple bell cranks with weight arms 70 on the latch hooks 72, adapted to coact with a toothed plate 74 secured to the bottom of the platen as before, the bell cranks being pivoted, as indicated at 75, on a shaft carried by a suitable bracket 76 and having teeth offset from each other or verniered. This construction allows for an undercut tooth arrangement as shown, and by using a series of latch hooks, each extending a little further from the pivot than the next, the teeth may be of large size and yet engagement at short intervals may be assured, the same as with the previously described construction.

From the foregoing description, it will be seen that I have provided a device applicable to well known forms of car dumpers which will effectively prevent the platen on the cradle of the car dumper from moving sideways when the clamping effect of the car on the rails is released. The particular forms in which my invention is illustrated as embodied are exemplary only, and its principle is capable of adaptation to various forms of dumper and cradle constructions by the use of various latching devices, within the scope of the appended claims.

Having thus described my invention, I claim:

1. In a car dumper, the combination of a cradle, and a laterally movable platen on the cradle onto which a loaded car may be run, means for tilting the cradle and means operating automatically when the cradle is tilted for latching the platen against shifting laterally with relation to the cradle.

2. In a car dumper of the class described, the combination of a cradle, and a laterally movable track platen on the cradle, means for tilting the cradle, means for clamping a car to the cradle while inverted, said means tending to move the platen sideways, and means for latching the platen in a fixed position as the cradle is being rotated to dumping position.

3. In a car dumper of the class described, the combination of a cradle, and a laterally movable track platen onto which a loaded car may be run, means for tilting the cradle, and means for latching the platen against the shifting laterally on the cradle when the cradle is tilted, said means including a series of toothed members, and means for actuating the members independently of each other and simultaneously.

4. In a car dumper of the class described, the combination of a cradle, and a laterally movable platen onto which a loaded car may be run, means for tilting the cradle, and means for latching the platen against the shifting laterally against the cradle when the cradle is tilted, said means including a series of latch members having teeth spaced progressively, and a rack extending over all the latch teeth and rigid with the platen, and means for moving the latch members when the cradle is tilted.

5. In a car dumper of the class described, a cradle on to which a car may be run and a track carrying platen laterally movable on the cradle, means for clamping a car to the cradle while inverted and means self-contained on the cradle and platen for latching the platen against sideways movement, said means becoming effective upon the tilting movement of the cradle and remaining effective during further tilting thereof.

6. In a car dumper of the class described the combination of the cradle, the laterally movable track and support therefor on the cradle onto which a loaded car may be run, means for tilting the cradle, and means actuated by the tilting of the cradle for engaging the track supports to prevent shifting of the car while the cradle is in a tilted position.

7. In a car dumper of the class described the combination of a cradle, a track and track support on the cradle onto which the loaded car may be run, means for shifting the track and support laterally of the cradle to bring the side of the car against the side of the cradle, and means rendered effective by the tilting of the cradle for latching the track support to prevent movement thereof while the cradle is further tilted, said means becoming released upon the cradle resuming a position with the car upright.

8. In a car dumper of the class described the combination of a cradle, a track and support therefor movable laterally on the cradle, means connected to the support and including counterweights for moving the support and track laterally on the cradle, means for clamping the car support to the cradle including a shoulder on the clamp adapted to be engaged to prevent lateral movement of the support and track with relation to the cradle, means for engaging the shoulder consisting of a plurality of shoulders movable toward and away from the first mentioned shoulder and carried by the cradle, and weights acting to move said shoulders into engagement consequent upon a tilting movement of the cradle.

9. In a car dumper of the class described, the combination of a cradle, a laterally movable track support and track thereon, mounted on the cradle and onto which a loaded car may be run, means for tilting the cradle, and means effecting a lateral movement of the platen to move the car against the side of the cradle, a laterally facing shoulder rigid with the supports, a series of verniered latches carried by the cradle and adapted to engage said shoulder.

10. In a car dumper of the class described, the combination of a cradle, a track support and track mounted on the cradle and onto which a loaded car may be run, said support and track being laterally movable on the cradle to bring the car against the side of the cradle, a plurality of ratchet teeth rigid with the support, a plurality of movable latch members having complementary ratchet teeth and carried by the cradle and adapted to be moved into engagement with the ratchet teeth on the platen, means for effecting such movement consequent upon the tilting movement of the cradle, the teeth being adapted to engage in a plurality of positions within the space of the pitch of one of the teeth.

11. In a car dumper of the class described, the combination of a cradle, a track support and track mounted on the cradle and onto which a loaded car may be run, said support and track being laterally movable on the cradle to bring the car against the side of the cradle, means for locking the platen including a plurality of ratchet teeth, a plurality of latch members having complementary ratchet teeth in a vernier spacing and adapted to be moved into engagement with the first named ratchet teeth, means for effecting such movement consequent upon the tilting movement of the cradle, said vernier arrangement permitting the use of large and strong parts engaging in a plurality of positions within less distance than the pitch of any one engaging member.

12. In a car dumper, the combination of a cradle, and a laterally movable track platen onto which a loaded car may be run, means for tilting the cradle, and means for latching the platen against shifting laterally on the cradle when the cradle is tilted, said means being carried partly by the platen and partly by the cradle and including a toothed member on one of them and a set of members on the other.

13. In a car dumper, the combination of a cradle, a laterally movable platen thereon onto which a loaded car may be run, means for tilting the cradle, and means for latching the platen against shifting laterally, said means including a series of latch members spaced progressively, and a rack having teeth to coact with any of the latch members.

14. In a car dumper, the combination of the cradle, a laterally movable track and support therefor on the cradle onto which a loaded car may be run, means for tilting the cradle, and means for locking the support to the cradle including a rack on one of them and a plurality of members having a vernier spacing on the other.

15. In a car dumper, the combination of a cradle, a laterally movable platen having a track thereon, mounted on the cradle and onto which a loaded car may be run, means for tilting the cradle, and means effecting a lateral movement of the platen to move the car against the side of the cradle and a latching device for the platen including a rack on the platen and a cooperating member mounted on the cradle and provided with a counterweight.

16. In a car dumper, a combination of a cradle, a shiftable platform therein, a rack on one of such members and a plurality of verniered teeth on the other of such members adapted to cooperate with the rack.

In testimony whereof, I hereunto affix my signature.

ROBT. W. CRIST.